(12) United States Patent
Howard

(10) Patent No.: US 7,283,804 B2
(45) Date of Patent: Oct. 16, 2007

(54) METHOD OF CONTROLLING A NETWORK ENTITY AND A MOBILE STATION

(75) Inventor: Joe Howard, Dublin (IE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 10/516,715

(22) PCT Filed: Jun. 26, 2002

(86) PCT No.: PCT/EP02/07076

§ 371 (c)(1),
(2), (4) Date: Dec. 2, 2004

(87) PCT Pub. No.: WO2004/004199

PCT Pub. Date: Jan. 8, 2004

(65) Prior Publication Data

US 2005/0221797 A1   Oct. 6, 2005

(51) Int. Cl.
*H04M 1/68* (2006.01)
(52) U.S. Cl. ............... 455/411; 455/415; 380/44; 380/201; 380/247
(58) Field of Classification Search ............. 455/410, 455/411, 415, 424, 551; 705/51; 715/153, 715/165, 189; 380/44, 201, 277, 27, 247
See application file for complete search history.

(56) References Cited

U.S. PATENT DOCUMENTS

| | | | |
|---|---|---|---|
| 5,077,790 A * | 12/1991 | D'Amico et al. ............. 380/249 |
| 5,091,942 A | 2/1992 | Dent | |
| 5,241,598 A | 8/1993 | Raith | |
| 6,711,264 B1 * | 3/2004 | Matsumoto et al. ......... 380/283 |
| 6,931,543 B1 * | 8/2005 | Pang et al. .................. 713/193 |
| 2002/0184256 A1 * | 12/2002 | Reich et al. ................. 707/500 |
| 2003/0142125 A1 * | 7/2003 | Salmimaa et al. ........... 345/733 |
| 2005/0182710 A1 * | 8/2005 | Andersson et al. ........... 705/39 |
| 2005/0184145 A1 * | 8/2005 | Law et al. .................... 235/380 |
| 2005/0198126 A1 * | 9/2005 | Verbestel ..................... 709/204 |

OTHER PUBLICATIONS

European Patent Office, International Search Report for PCT/EP02/07076, dated Feb. 14, 2003.
"TDMA Third Generation Wireless Authentication, Encryption of Signaling Information/User Data, and Privacy" TIA/EIA Standard, Mar. 31, 2000, http://ftp.tiaonline.org/UWC136/136-510-B.pdf, retrieved Jan. 18, 2006.

* cited by examiner

*Primary Examiner*—Charles N. Appiah
*Assistant Examiner*—Nghi H. Ly
(74) *Attorney, Agent, or Firm*—Roger S. Burleigh

(57) ABSTRACT

A network entity and the mobile station are adapted to conduct a plurality of predetermined message exchange procedures, including encryption key generation procedures. The method comprises determining whether a received message from a mobile station is encrypted. If the received message is encrypted, it is determined whether a correct encryption key for decrypting said message is available to said network entity and, if no correct key is available, a predetermined triggering message is sent to the mobile station. The mobile station then interrupts the procedure exchange procedure and initiates an encryption key generation procedure.

5 Claims, 5 Drawing Sheets

METHOD OF CONTROLLING A NETWORK ENTITY AND A MOBILE STATION

FIELD OF THE INVENTION

The present invention relates to a method of controlling a network entity of a mobile communication network and a mobile station arranged to communicate with the mobile communication network, and to a network entity and mobile station capable of performing the method.

BACKGROUND OF THE INVENTION

It is known to use encryption in mobile communication systems. In other words, in order to enhance security, messages exchanged over the air-interface between a mobile station and a network entity of a mobile communication network are encrypted, such that the sending side uses an encryption key and the receiving side requires an appropriate key for decrypting the message and thereby discerning the message content. It should be noted that the present specification and claims shall use the term "key" or "encryption key" with respect to keys used both for encryption and decryption. It should also be noted that the term "network entity" shall be used for any network element or combination of network elements that fulfils a given function, such as the function of handling message exchanges with a mobile station. As such, a network entity can be provided by hardware, software or any combination of hardware and software, and can be implemented in one node of a mobile communication network, or spread out over several nodes.

In order to provide both the mobile station and the network entity with appropriate corresponding encryption keys, with which each respective element can decrypt messages received from the other, it is possible to generate one encryption key in one element, store it in that element, and then transmit it to the other element. However, this is highly disadvantageous, as it is possible that the encryption key sent over the air-interface is intercepted. Consequently it is preferred to implement respective and corresponding encryption key generation procedures in both the network entity and the mobile station, where corresponding encryption keys (which may be identical, or different from one another, depending on the encrypting scheme used) are respectively generated in parallel, such that the mobile station and the network entity can each on their own have corresponding or matching encryption keys. The correspondence between the encryption keys is ensured by using corresponding algorithms in the mobile station and network entity. This is well known and need not be described in more detail.

Furthermore, it is known to start the encryption key generation on the two respective sides using a common seed value, e.g. a regularly changed random or pseudo-random value broadcast by the mobile communication network to all network entities and listening mobile stations.

The generation of encryption keys is commonly performed at predetermined instances, for example when the mobile station registers with the mobile communication network. Usually the encryption keys are only generated at certain types of registrations, such as power-on, the transition from one switching entity (e.g. a mobile switching center MSC) to another, or forced registration, in which the network commands the mobile station to perform a registration.

The communication between a mobile station and a network entity is commonly arranged such that it will use a plurality of message exchange procedures in the course of which predetermined messages are exchanged between the network entity and the mobile station, the type and number of exchanged messages depending on the given message exchange procedure. Examples of message exchange procedures are a registration procedure, a link set-up procedure, a link configuration procedure, a call set-up procedure etc. For example, if the mobile station wishes to originate a call, it will send a predetermined call origination request to the network entity, and will then wait for a certain type of response message. In other words, the mobile station will wait until a precise and expected type of response from among a limited number of possible responses, e.g. one that confirms the receipt of the origination request, or one that provides call establishment information, etc. Messages not belonging to the limited group of expected responses will be ignored and the entity will continue to wait for an expected message. Usually, a time-out feature will also be implemented, according to which the mobile station only waits for a predetermined time-out period. After the time-out period expires, the mobile station can e.g. repeat the request, or also enter an idle mode and indicate a corresponding failure to the user of the mobile station, e.g. a call establishment failure in the above mentioned example of initially sending a call set-up request.

The message exchange procedures can be such that some or all exchanged messages in a given procedure are encrypted. It may be noted that the term "encrypted message" refers to any message of which at least a part is encrypted. For example, an encrypted message can be a message that contains a (first) unencrypted part and a (second) encrypted or encryptable part. As an example, a message could be contained in one or more packets, each having a header and a payload section, where the header is not-encrypted and the payload section is.

An example of rules governing the use of encryption in the communication between a mobile station and the network entity of a mobile communication network is provided by standard TIA/EIA-136 published by the Telecommunication Industry Association. In TIA/EIA-136 a mode called enhanced privacy and encryption (EPE) is provided, which is an authentication-related capability that adds confidentiality to signals transmitted over a time division multiple access (TDMA) digital channel between a base station of a mobile communication network and a mobile station. The encryption, if supported by the network entity and the mobile station, is mandatory and is automatically activated, pending hand shaking procedures between the mobile station and base station. TIA/EIA-136 specifies that with EPE encryption is automatically activated after authentication is complete if both the mobile station and the system support the feature. TIA/EIA-136 further specifies that support for EPE is mandatory for mobile stations that adhere to protocol version 4, but mobile stations that adhere to lower protocol versions may also support EPE.

The type of encryption applied together with the type of data encrypted, is controlled and authorized by means of encryption domains. Encryption domains define the level and type of encryption desired, the manner in which the encryption shall be applied and the data eligible for encryption. The encryption domain identifies portion of FACCH/SACCH (Fast Associated Control Channel/Slow Associated Control Channel) messages on digital or analogue channels that are subject to encryption, together with the encryption algorithm to be applied. Previously, for the introduction of EPE, a single encryption domain had been defined, namely, Domain-A. This allowed the encryption of a portion of the messages on the FACCH/SACCH together with the payload (circuit-switched speech or data) on a digital traffic channel and a portion of the messages on the analogue voice channel. This information, defined by the Domain-A encryption domain, is eligible for encryption by the Domain-A encryption algorithms only. The encryption of payload (circuit-switched speech or data) by a Domain-A encryption is commonly known as voice privacy or the encryption of layer 3 messages by a Domain-A encryption is commonly known as Domain-A message encryption.

EPE introduces a new encryption domain, namely Domain-B. The Domain-B encryption domain again defines a portion of the messages on the FACCH/SACCH digital traffic channel, a portion of messages on the digital control channel together with payload (circuit-switched speech or data). This information, defined by the Domain-B encryption domain is eligible for encryption by Domain-B encryption algorithm.

A single encryption algorithm known as Scema is introduced as the domain-B encryption algorithm, producing encryption keys for the encryption of both circuit-switched speech/data on a digital traffic channel and Layer3 messages (both on digital traffic and digital control channels), as defined by TIA/EIA-136.

The Domain-B encryption applies to the following:

Domain-B message encryption for user signalling on the digital control channel. The DCCH-encryption key (DCCH=Digital Control Channel), generated in both the mobile station and the network entity, is applied to specific Layer3 TIA/EIA-136 DCCH messages.

Domain-B message encryption for user signalling on the digital traffic channel. The DTC-encryption key, generated in both the mobile station and the network entity is applied to specific Layer3 TIA/EIA-136 DTC-messages.

Domain-B encryption on the digital traffic channel for both circuit-switched voice and data. The DTC-encryption key generated in both the mobile station and the network entity is applied to circuit-switched voice and data. EPE on the DCCH is activated at registration. Both the mobile station and system generate the Domain-B encryption keys, based on among other information, the currently available value of a parameter called RAND (a random variable which is broadcast on the control channel) and other information. The generation of the keys is performed on both the mobile station side and the network side in parallel. This ensures that the encryption keys are "synchronized", where "synchronized" means that the keys on either side are in correct correspondence to one another, such that each side can decrypt the messages encrypted by the other side. The generated encryption keys are stored in both the mobile station and the network.

The encryption keys are only generated at certain types of registration, including power-on, transition to a new switching entity (MSC), and forced registration, where the network entity informs the mobile station whether EPE should be activated via the registration accept message.

Once activated, the mobile shall encrypt a portion of RACH messages (RACH=Random Access Channel) with the generated encryption key. Layer3 messages subject to Domain-B encryption on the reverse digital control channel are: Origination, Page Response, R-data and Serial Number.

Layer3 messages subject to Domain-B encryption on the forward digital control channel are: Analogue Voice Channel Designation, Digital Traffic Channel Designation, Message Waiting-, Page, R-data, Registration Accept and User Alert messages.

On reception of a message on the RACH from a mobile station camped on a DCCH, the network entity will determine whether a message is encrypted or not with Domain-B encryption, by using the message encryption indicator field of the Layer2 extension header. If the message is not encrypted, then processing of the message will occur as implemented in the given system. If the encryption indicator field indicates that a message is encrypted with Domain-B encryption, the Domain-B DCCH-encryption key shall be retrieved from its storage location, e.g. a visitor location register VLR, where the encryption is stored together with other information related to the subscriber using the mobile station that is in communication with the network entity. Once the Domain-B DCCH-encryption key is available, the message shall be decrypted and processing of the message is completed as implemented in the network.

The terms Layer3 and Layer2 used above refer to different levels specified by TIA/EIA-136, and are not to be understood as layers within the meaning of the OSI model.

OBJECT OF THE INVENTION

The object of the invention is to improve the operation of a network entity of a mobile communication network and a mobile station that are able to exchange encrypted messages, and which both are arranged to conduct respective encryption key generation procedures in parallel.

SUMMARY OF THE INVENTION

In accordance with the present invention, the network entity and mobile station are arranged to operate such that if the network entity receives a message from the mobile station, it determines whether the received message is encrypted, and if the received message is encrypted, it determines whether a correct encryption key for decrypting the message is available to the network entity. In other words, it is determined whether any encryption key is available, and if one is available, it is determined whether this key is the correct one, which can be recognised by analysing the decryption result. In other words, if the decryption is not successful, then the used key is evidently not correct.

The network entity is furthermore arranged such that if no correct key is available, then a predetermined triggering message is sent to the mobile station. The mobile station is arranged such that upon receiving the predetermined triggering message, it interrupts the message exchange procedure currently active, i.e. the procedure in the course of which it sent the encrypted message for which the network entity did not have a correct key, and initiates an encryption key generation procedure. Through the parallel encryption key generation procedures, the mobile station and network entity in parallel generate matching or corresponding encryption keys and are thereby again "synchronized" with respect to encryption, i.e. both have the correct encryption key for decryption encrypted messages sent by the other side.

The specific advantage of the present invention lies in the fact that the mobile station does not wait until the ongoing message exchange procedure comes to an end by itself, e.g. by a time-out. Namely, it has been recognised by the inventor of the present invention that under conventional circumstances, if for any reason the network entity can not obtain a correct encryption key for decrypting an encrypted message received from the mobile station, the network entity can not respond appropriately, such that the mobile station will continue the ongoing message exchange procedure that sent the encrypted message, i.e. would wait for the expected response to the encrypted message, which expected response, however, can not be provided by the network entity, as it can not decrypt the message. During this time of continuing the ongoing message exchange procedure, i.e. waiting, a conventional mobile station will disregard any other communications or messages from the network entity, even a message indicating that the mobile station should re-register. Such a re-registration will only occur when the conventional mobile station has returned to the idle mode after having finally abandoned the message exchange procedure. The time until the conventional mobile station abandons the message exchange procedure can last very long, as it does not only include the time-out period, because it is also possible that after a first expiry of the time-out period, the mobile station will reinitiate the message exchange procedure using encrypted messages, to which the network entity can not respond, such that several time-out periods may pass before the conventional mobile station will enter an idle mode, in which it can re-register and thereby perform an encryption key generation procedure in parallel with the network entity.

Such a disadvantage is completely obviated by the teaching of the present invention. Namely, if the network entity is unable to decrypt a received encrypted message, it sends a triggering message to the mobile station, whereupon the mobile station interrupts the ongoing message exchange procedure, i.e. does not wait until a time-out occurs, in order to immediately initiate an encryption key generation procedure in parallel with the network entity. Thereby, an unnecessary loss of time for performing encryption key generation procedures in the network entity and mobile station is avoided.

Preferably, the messages are arranged such that they have a first part and a second part, where the first part is an unencrypted part that is not allowed to be encrypted (i.e. always unencrypted) and a second part that is encryptable. Then, the unencrypted part may contain an encryption indication of whether the second part is encrypted or not, and the step of determining whether a received message is encrypted is performed by analysing the encryption indication.

According to another preferred embodiment, when the messages are arranged such that the first part contains a message type identifier identifying the type of the message (e.g. link set-up request, call set-up request, etc.), the network entity is arranged to identify the message type of the received message from the message type identifier, and to determine whether the identified message type belongs to a predetermined category, and to only send the triggering message to the mobile station if the message type falls into the predetermined category. For example, the predetermined category can be that the received message is a set-up request. Then, the triggering message will only be sent if the received encrypted message for which no correct encryption keys available, is a set-up message. According to another preferred embodiment, the encryption key generation procedures used in the network entity and the mobile station comprise obtaining an encryption base value, such as the seed value mentioned in the introduction, for generating corresponding encryption keys based thereon. Preferably, the encryption base value is a regularly changed value that is broadcast by the network to listening mobile stations, such as the above mentioned random or pseudo-random value RAND.

According to another preferred embodiment, the encryption key generation procedure is conducted as a part of a registration procedure for the mobile station with the network entity. In other words, the initiation of the encryption key generation procedure comprises initiating a registration or re-registration procedure of the mobile station with the mobile communication network to which the network entity belongs, in the course of which parallel encryption key generation procedures are conducted in the network entity and the mobile station.

BRIEF DESCRIPTION OF DRAWINGS

Further aspects and advantages of the present invention shall become apparent from the study of the following detailed description of preferred embodiments of the invention, which are given as examples and are not intended to be limiting, where the description makes reference to the attached drawings in which.

DETAILED DESCRIPTION OF EMBODIMENTS

Figure 1:
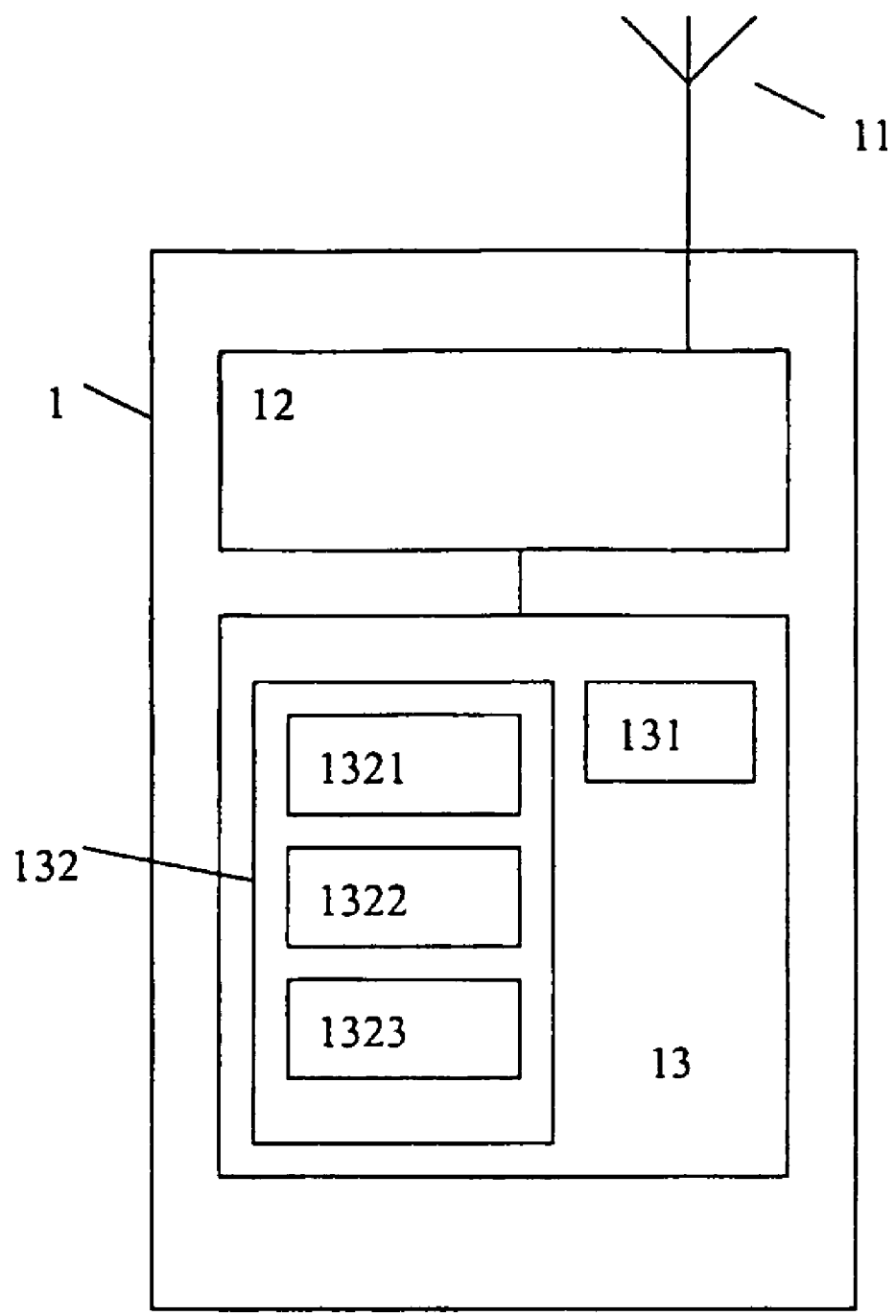
FIG. 1 shows a schematic representation of a mobile station of an embodiment of the present invention.

FIG. 1 shows a schematic block diagram of a mobile station 1 arranged to operate according to the present invention. FIG. 1 shows an antenna 11, a transmitting and receiving part 12, and a signal processing section 13. The signal processing section 13 comprises a processor 132 and a memory 131. The processor 132 is indicated as comprising an encryption key generator 1321, a message encryptor/decryptor 1322 and a controller 1323 for controlling the operation of the mobile station. It may be noted that the mobile station will generally contain further conventional features, such as a microphone, loudspeaker, display, keyboard and other well known elements, which are not shown, as they have no relevance for the present description.

The encryption key generator 1321, message encryptor/decryptor 1322 and controller 1323 are shown as being software components executed by the processor 132. However, it may be noted that they could also be provided as separate hardware components, or as any suitable combination of hardware and software.

The encryption key memory 131 can be provided in any suitable or desirable way, e.g. as a RAM. The signal processing section 13 can comprise further memory elements, such as ROMs for storing software and other information, where such additional memory elements are not shown for simplicity.

According to the embodiment shown in FIG. 1, the encryption key generator 1321 serves to generate an encryption key, which is then stored in the encryption key memory 131. The message encryptor/decryptor 1322 encrypts messages sent to the mobile communication network by the mobile station 1, and decrypts messages received from the mobile communication network, by using one or more stored encryption keys. The contact with the mobile communication network is established by the transceiver 12 and antenna 11, as is well known, such that a further description is not necessary here.

According to the embodiment of FIG. 1, the controller 1323 is arranged to control the operation of the mobile station 1, and is specifically arranged to perform one or more predetermined message exchange procedures with the mobile communication network, such as a link set-up, call set-up, etc. In the course of such message exchange procedures, the mobile station sends predetermined types of messages (such as a call set-up request) and waits for predetermined corresponding types of response messages from the communication network (such as a call set-up acknowledgement). Furthermore, the controller 1323 is arranged to identify the receipt of a predetermined unencrypted triggering message from the mobile communication network during the course of an ongoing message exchange procedure, and is arranged to interrupt the ongoing message exchange procedure in response to receiving the predetermined unencrypted triggering message, and to then initiate an encryption key generation procedure.

Figure 3:
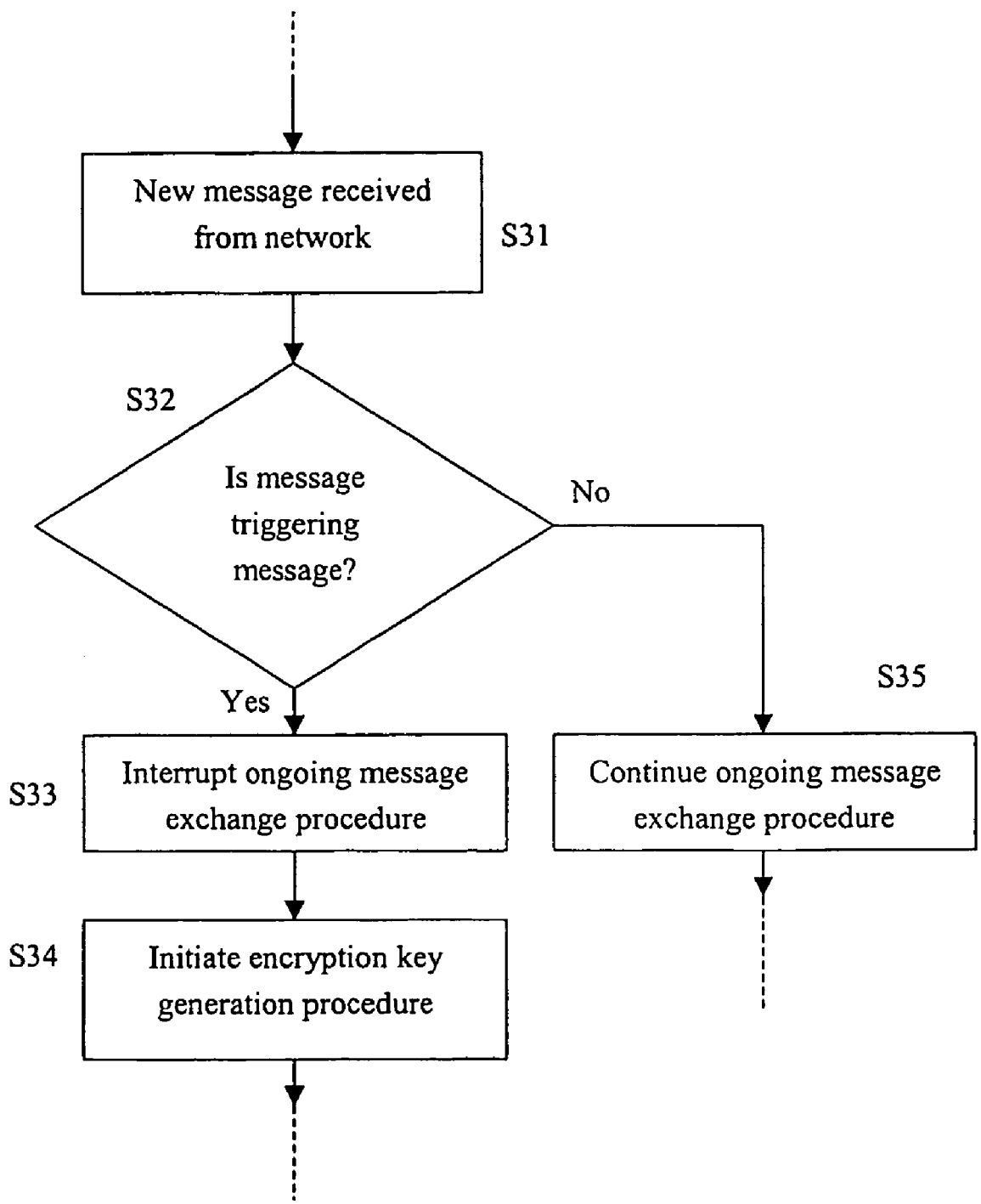
FIG. 3 shows a flowchart of a routine conducted in a mobile station according to an embodiment of the present invention.

This can also be seen in the flow chart of FIG. 3, which shows a part of a routine executed by the controller 1323. In step S31, the receipt of a new message from the mobile communication network is detected. Subsequently, in step S32 it is determined whether the received message is of a predetermined type and is a triggering message. If it is a triggering message, then the procedure goes to step S33, in which the ongoing message exchange procedure is interrupted, and whereupon step S34 is conducted, in order to initiate an encryption key generator procedure, e.g. as a part of a registration or re-registration procedure of the mobile station with the mobile communication network. On the other hand, if step S32 determines that the received is not the predetermined triggering message, then the procedure branches to step S35, in which the ongoing message exchange procedure is continued.

Figure 4:
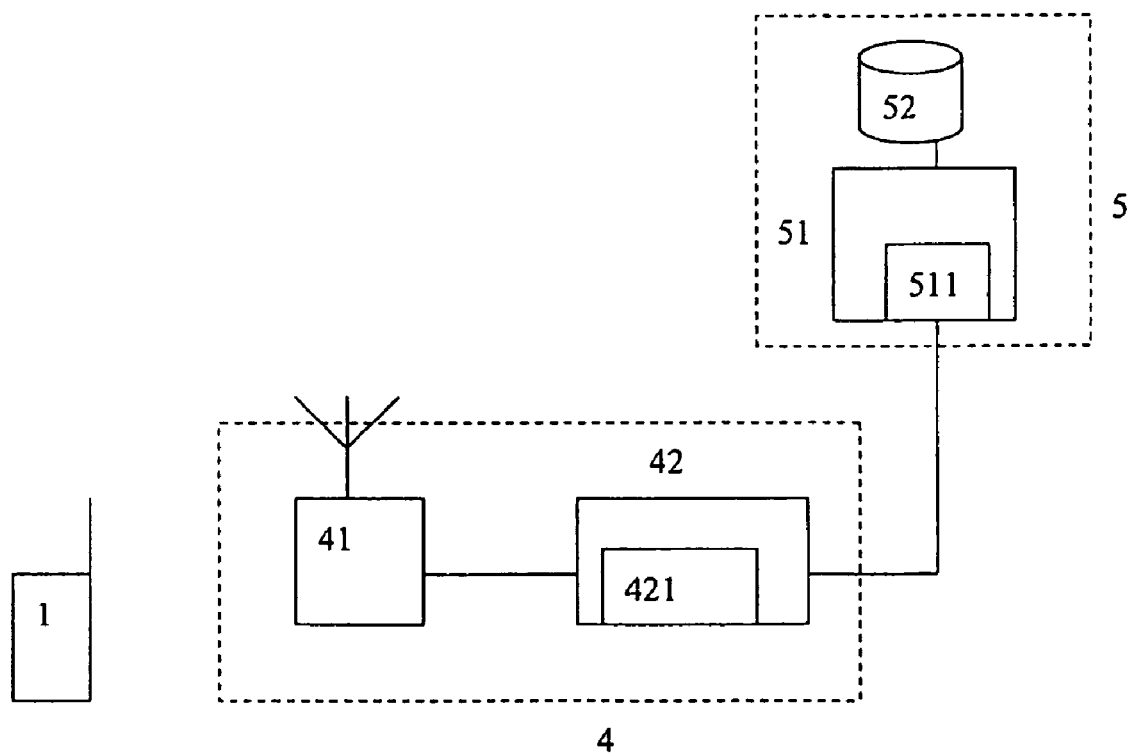
FIG. 4 shows a schematic representation of a mobile station and a network entity according to an embodiment of the present invention.

FIG. 4 shows a schematic representation of a network entity and a mobile station 1. In the example of FIG. 4, the network entity consists of a base station part 4 and a traffic control part 5, where said base station part 4 comprises a base transceiver station (BTS) 41 and a base station controller (BSC) 42. The traffic control unit 5 comprises a mobile switching network (MSC) 51 and a data base 52, which comprises a home location register (HLR) and visitor location register (VLR). The network entity thereby has the structure known from GSM, such that a further description is not necessary here. It may be noted that the base station controller 42 may be connected to a plurality of base transceiver stations, and that the mobile switching center 51 may be connected to a plurality of base station parts (i.e. a plurality of base station controllers). Also, the mobile switching center 51 is typically connected to further network entities, such as gateways to other networks, which is well known in the art and not shown in FIG. 4 for simplicity.

According to the embodiment of FIG. 4, the network entity provided by base station part 4 and traffic control part 5 comprises an encryption key generator 511 located in the mobile switching center 51, where the data base 52 acts as an encryption key memory for storing encryption keys generated by the encryption key generator 511. Furthermore, a message encryptor/decryptor 421 is provided in the base station controller 42 for encrypting messages sent to the mobile station 1 and decrypting messages received from the mobile station 1 using an encryption key stored in the database 52. It may be noted that the generated encryption keys are preferably stored in the VLR part of the database 52, in association with other data belonging to the subscriber using the mobile station 1.

Figure 5:
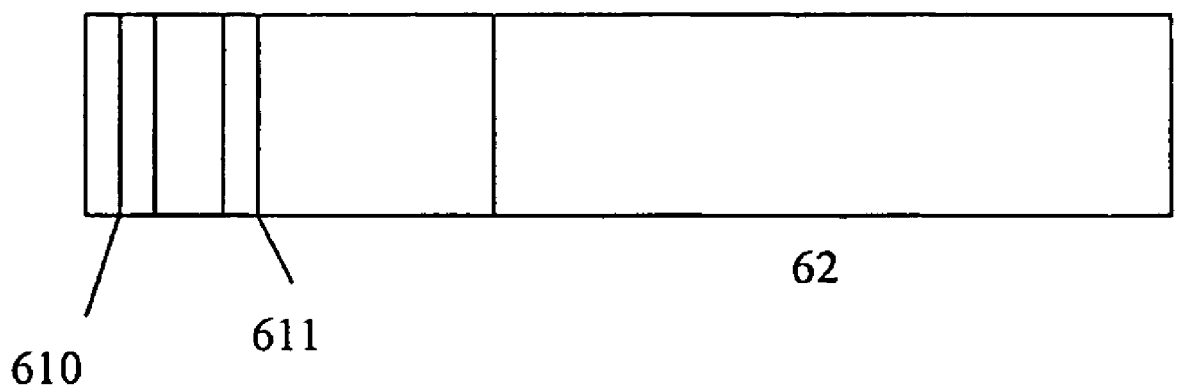
FIG. 5 shows a schematic representation of a message containing a first unencrypted part and a second encryptable part.

The mobile switching center acts as a controller for controlling the communication between the network entity 4, 5 and the mobile station 1, where the MSC 51 is arranged to determine whether messages received from the mobile station 1 are encrypted or not, and if a received message is encrypted, determining whether a correct key for decrypting the message is available or not. If no correct key is available, then a predetermined unencrypted triggering message is sent to the mobile station 1, for triggering an immediate encryption key generation procedure in the mobile station 1, as explained previously with respect to FIGS. 1 and 3. An example of a routine executed by controller 51 is shown in the flow chart of FIG. 2. In step S21 it is determined whether a message received from the mobile station 1 is encrypted or not. Step S21 can be implemented in a variety of ways. For example, it is possible that the mobile station 1 sends un unencrypted indication signal to the network entity, said unencrypted indication signal informing the network entity that all subsequent messages sent by the mobile station are encrypted. In this case, step S21 simply consists in determining that the message is such a subsequent message. Preferably, the message structure is as shown in the example of FIG. 5, namely a message 6 consists of a first part 61, which is not allowed to be encrypted, and a second part 62, which is encryptable. The unencryptable part 61 preferably contains a message type identifier 610 that identifies the type of the message (e.g. as a call set-up request), and an encryption indication 611 that indicates whether the encryptable part 62 is in fact encrypted or not. As such, the encryption indication 611 can be a single bit, where one bit value indicates encryption and the other lack of encryption. Naturally, the encryption indication 611 can also be more complicated and contain further information.

Figure 2:
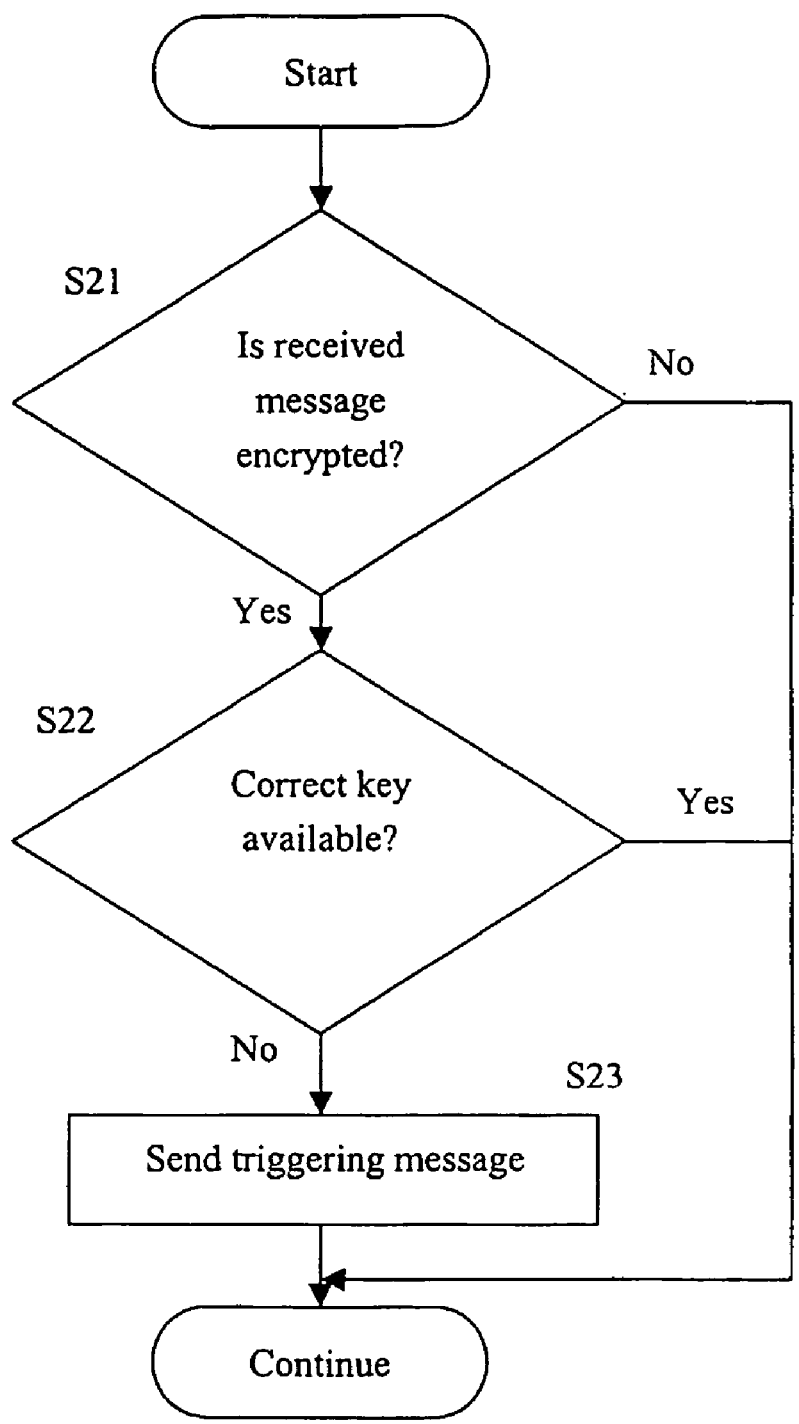
FIG. 2 shows a flowchart of a procedure conducted in a network entity in accordance with an embodiment of the present invention.

In this case, step S21 in FIG. 2 consists in examining or analysing the encryption indication 611. If the message is encrypted, step S22 determines whether a correct key is available. For example, this can consist in determining whether any key is available in the database 52 for the mobile station 1 (the subscriber using mobile station 1), and if not, then this already indicates that no correct key is available. However, it is also possible that a key is available, but that a decryption attempt for the received message leads to the conclusion that the key is not correct, as it does not lead to a successful decryption.

There are several reasons why a correct encryption key may not be available for decrypting the received message. For example, if the encryption keys are stored in the VLR in association with other subscriber data, it is possible that they are deleted in the course of regular "re-cycling" operations conducted by the operator of the networks, in which subscriber records are deleted if the corresponding mobile station has not registered with the network within an operator-defined period of time. It is possible that an active mobile station has disabled the periodic registration function, or that it has "missed" a registration due to temporary communication problems. If the subscriber record has been re-cycled, then the encryption key is lost, and if the mobile station then proceeds to send an encrypted message, e.g. a call set-up request, then the network entity can not decrypt the message and respond accordingly.

Returning to FIG. 2, if the outcome of step S22 indicates that no correct key is available, then a procedure S23 is initiated, in which a predetermined unencrypted triggering message is sent to the mobile station, which makes the mobile station conduct an immediate encryption key generation procedure. In the course of this encryption key generation procedure, e.g. a registration or re-registration, the network entity also performs an encryption key generation procedure in parallel, such that matching or corresponding encryption keys are available both in the mobile station and the network entity, and encrypted messages can again be exchanged without any problems.

In the example of FIG. 4, the message encryptor/decryptor 421 and the encryption key generator 511 are shown as software routines implemented in the base station controller 42 and mobile switching center, respectively. However, it may be noted that the encryption key generator 511 and the message encryptor/decryptor 421 can also be provided as separate hardware elements or as any suitable combination of hardware and software. Moreover, the structure of the example of FIG. 4 is only an example, and the functional elements can also be provided otherwise, e.g. spread out over all of the shown nodes or provided in other nodes. Moreover, the database 52 associated with the mobile switching center 51 can be used as an encryption key memory, but an encryption key memory can also be provided in association with any other element shown in FIG. 4. Furthermore, although the example of FIG. 4 is related to GSM, the concept of the present invention is not restricted to GSM mobile communication networks, but can be used in the context of any mobile communication system in which encrypted messages are used, and in which encryption key generation procedures are implemented on the mobile station side and the network side.

Now a preferred embodiment of the present invention shall be explained in the context of the standard TIA/EIA-136 discussed in the introduction to the application. It may be noted that the discussion of TIA/EIA-136 in the introduction is herewith incorporated into the disclosure of the invention.

On reception of an encrypted RACH message from the mobile station, the network entity will be able to determine that the message is encrypted via the Layer2 header information (as e.g. shown in FIG. 5). If the Bomain-B DCCH-encryption key is not available and the network entity is unable to decrypt the message, it can use a message indicator (such as the indication 610 shown in FIG. 5) to determine what message the mobile has sent as the message type is not encrypted.

As one possibility, the network entity can reject the service requested by the message, regardless of the message type, and send an unencrypted layer 3 message to the mobile station, stating that the reason for rejection is a "system-related cryptography mismatch". Preferably, the message indicating the system-related cryptography mismatch is only sent for messages of a certain type. In other words, it is preferably analysed whether the message type of an encrypted message that is not decryptable belongs to a predetermined category (e.g. the category defined by all set-up messages), and the message indicating system-related cryptography mismatch is only sent if the received encrypted message belongs to the predetermined category.

More specifically, examples of received encrypted messages from the mobile station in response to which the network entity can send a message indicating system-related cryptography mismatch are the following Layer3 messages: Origination Message, Page Response Message and R-data Message. In response to the Origination Message, the network entity can build a Reorder/Intercept message including the indication "system-related cryptography mismatch" in the Cause Extension Information Element. In response to the Page Response Message, the network entity can send a Release message, which also includes the "system-related cryptography mismatch" in the Cause Extension Information Element. Finally, in response to the R-data message, the network entity can send a Reorder/Intercept message, also including the "system-related cryptography mismatch" in the Cause Extension Information Element. Alternatively, a R-data reject message can also be sent.

On reception of one of the above described response messages, which are all examples of triggering messages, the mobile station is arranged to examine the received cause value (the Cause Extension Information Element). If the reason is "system-related cryptography mismatch", the mobile station is arranged (programmed) to immediately interrupt the ongoing procedure (e.g. interrupt waiting for the appropriate response to the sent message), and declaring a Forced Registration condition, in order to invoke a Registration procedure. In the Registration procedure, a parallel encryption key generation procedure is conducted in the mobile station and the network entity. The registration procedure is e.g. specified in TIA/EIA-136-123: TDMA third generation wireless digital control channel Layer3.

In order to implement the above described example in context of TIA/EIA-136, the appropriate specification may be updated as follows: The Cause Extension IE should be updated to contain the rejection reason "system-related cryptography mismatch". The Waiting for Order State should be updated to allow the mobile station to declare a Forced Registration condition and invoke the Registration procedure on reception of a Release message, specifying the reason for rejection as "system-related cryptography mismatch". The Origination Proceeding State should be updated to allow the mobile station to declare a Forced Registration condition and invoke the Registration procedure on reception of a Reorder/Intercept message specifying the reason for rejection as "system-related cryptography mismatch". The Originated Point-to-Point Teleservice Proceeding should be updated to allow the mobile station to declare a Forced Registration condition and invoke the Registration procedure on reception of a Reorder/Intercept message, specifying the reason for rejection as "system-related cryptography mismatch".

The invention claimed is:

1. A method of controlling a network entity of a mobile communication network and a mobile station, wherein said network entity and said mobile station are adapted to conduct a plurality of predetermined message exchange procedures in the course of which predetermined messages are exchanged between said network entity and said mobile station depending on the given procedure, where said predetermined messages may be encrypted, an encrypted message being any message of which at least a part is encrypted, and where said network entity and said mobile station are adapted to conduct one or more encryption key generation procedures during which the network entity and the mobile station generate and store respective corresponding encryption keys in order to be able to encrypt and decrypt exchanged messages, said method comprises the steps of:

if said network entity receives a message from said mobile station, determining whether said received message is encrypted;

if the received message is encrypted, determining whether a correct encryption key for decrypting said message is available to said network entity and, if no correct key is available, sending a predetermined triggering message to said mobile station; and upon receiving said predetermined triggering message, said mobile station interrupting the procedure in the course of which it sent the encrypted message for which the network entity did not have a correct key, and initiating an encryption key generation procedure;

wherein said messages are arranged such that they have a first part and a second part, said first part being an unencrypted part that is not allowed to be encrypted, and said second part being encryptable; and, wherein said messages are arranged such that said first part contains a message type identifier identifying the type of the message, and after having received a message from said mobile station, said network entity identifies the message type of said received message from the message type identifier and determines whether said identified message type belongs to a predetermined category, and sends said predetermined triggering message to said mobile station only if the message type of said received message falls into said predetermined category.

2. The method according to claim 1, wherein said messages are arranged such that said first part contains an encryption indication of whether said second part is encrypted or not, and said determining of whether the second part of said received message is encrypted or not is achieved by analysing said encryption indication.

3. The method according to claim 1, wherein said one or more encryption key generation procedures comprise obtaining an encryption base value commonly available to said network entity and said mobile station at the time of conducting said encryption key generation procedure, and generating corresponding encryption keys in said network entity and said mobile station on the basis of said encryption base value.

4. The method according to claim 3, wherein said encryption base value is a regularly changed value that is broadcast by said network to listening mobile stations.

5. The method according to claim 1, wherein said encryption key generation procedure is conducted as a part of a registration procedure of said mobile station with said network entity.

* * * * *